United States Patent
Cronin et al.

(10) Patent No.: US 6,609,421 B2
(45) Date of Patent: Aug. 26, 2003

(54) SIDESLIP CORRECTION FOR A MULTI-FUNCTION THREE PROBE AIR DATA SYSTEM

(75) Inventors: Dennis J. Cronin, Apple Valley, MN (US); Thomas D. Amerson, Minneapolis, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 09/850,796

(22) Filed: May 8, 2001

(65) Prior Publication Data

US 2002/0166375 A1 Nov. 14, 2002

(51) Int. Cl.[7] ................................. G01W 1/00
(52) U.S. Cl. .................. 73/170.02; 73/180; 73/170.01
(58) Field of Search ........................ 73/170.02, 180, 73/170.11, 488, 504.03, 514.11, 514.01, 511, 514.02; 364/424, 424.028; 244/181, 194, 177

(56) References Cited

U.S. PATENT DOCUMENTS

| | | | |
|---|---|---|---|
| 3,077,773 A | | 2/1963 | Gardner ........................ 73/180 |
| 4,230,290 A | * | 10/1980 | Townsend et al. ............. 73/180 |
| 4,428,549 A | | 1/1984 | Halliday et al. ............... 73/182 |
| 4,767,588 A | * | 8/1988 | Ito ............................. 364/424 |
| 5,205,169 A | | 4/1993 | Hagen ........................... 73/180 |
| 5,442,958 A | * | 8/1995 | Hagen ...................... 73/170.02 |
| 5,544,526 A | * | 8/1996 | Baltins et al. ................. 73/180 |
| 5,616,861 A | * | 4/1997 | Hagen ...................... 73/170.02 |
| 5,628,565 A | * | 5/1997 | Hagen et al. ................. 374/143 |
| 5,710,705 A | * | 1/1998 | Eckert ................... 364/426.028 |
| 5,852,237 A | * | 12/1998 | Renshaw ....................... 73/180 |
| 6,038,932 A | | 3/2000 | Wandel et al. ............. 73/861.65 |
| 6,070,475 A | * | 6/2000 | Muehlhauser ............. 73/861.68 |
| 6,352,223 B1 | * | 3/2002 | Larramendy ................. 244/177 |
| 6,253,166 B1 | * | 6/2002 | Whitmore et al. .............. 703/2 |

FOREIGN PATENT DOCUMENTS

| | | |
|---|---|---|
| DE | 37 27 906 A | 3/1989 |
| DE | 196 40 606 C | 9/1997 |
| EP | 0 262 702 A | 4/1988 |

OTHER PUBLICATIONS

Copies of a presentation to a customer by Rosemount Aerospace Inc. with a publication date as early as Nov. 1999. (22 pages).

* cited by examiner

Primary Examiner—Hezron Williams
Assistant Examiner—Andre Allen
(74) Attorney, Agent, or Firm—Westman, Champlin & Kelly, P.A.

(57) ABSTRACT

A multi-function probe system that provides redundancy for measurements and compensates for effects of sideslip of an aircraft includes at least two probes that are symmetrically located on the opposite sides of the aircraft, and a third probe mounted on the centerline of the aircraft positioned to directly measure local sideslip with ports that are positioned on opposite sides of the center plane of the aircraft. Each of the probes includes self contained instrumentation for providing signals indicating various pressures. The local angle of sideslip sensed by the third probe is used as a compensation for pressure readings at either of the other probes for determining actual angle of attack, and static pressure.

12 Claims, 6 Drawing Sheets

SIDESLIP CORRECTION FOR A MULTI-FUNCTION THREE PROBE AIR DATA SYSTEM

CROSS-REFERENCE TO RELATED APPLICATION

Cross reference is made to U.S. application Ser. No. 09/851,289, entitled "MULTI-FUNCTION AIR DATA PROBES USING NEURAL NETWORK FOR SIDESLIP COMPENSATION," filed May 8, 2001, U.S. application Ser. No. 09/950,863, entitled "METHOD TO CALCULATE SIDESLIP ANGLE AND CORRECT STATIC PRESSURE FOR SIDESLIP EFFECTS USING INERTIAL INFORMATION," filed May 8, 2001, and U.S. application Ser. No. 09/851,485, entitled "ITERATIVE METHOD OF AIRCRAFT SIDESLIP COMPENSATION FOR MULTI-FUNCTION PROBE AIR DATA SYSTEMS," filed May 8, 2001.

BACKGROUND OF THE INVENTION

The present invention relates to air data sensing systems that provide accurate compensation for measurement errors caused by sideslip of an air vehicle utilizing multi-function air data probes that are not pneumatically coupled, but which have processors for interchanging electrical signals between the multi-function probes. Compensation of pressure signals such as those measured at a number of discrete locations on a multi-function probe during sideslip of the air vehicle is necessary to provide true angle of attack and other aircraft parameters including altitude and airspeed. The requirement for accuracy in altitude indications is particularly important in Reduced Vertical Separation Minimum (RSVM) areas of the air traffic control system.

Conventional air data sensing systems have probes on opposite sides of an aircraft pneumatically connected so that the pressure signals are averaged between the right and left sides of the aircraft to provide a static pressure signal that is "nearly true". In most conventional systems, with pneumatically connected ports, corrections are made for Mach number and aircraft angle of attack, but it is rare that it is necessary to introduce further corrections for the effects of sideslip on static pressure.

However, SmartProbe™, multi-function probes which have processors as part of the instrument package right at the probe, are connected only electrically (digitally) in order to eliminate the need for pneumatic tubing passing between the opposite sides of the aircraft or between multi-function probes on the same side of the aircraft. The term "probes" is used to designate such multi-function probes. This means that each probe is pneumatically independent even if it is electrically "talking" to another probe. In the RVSM airspace, there needs to be highly accurate dual redundant systems in place for static pressure estimations. While information can easily be exchanged between the processors of different probes, the need for determining sideslip effects remains. Computational fluid dynamic analysis and flight testing has shown that position errors can be up to 600 feet per degree of sideslip under typical RVSM flight conditions, for example at 41,000 feet and Mach equal to 0.8. It is thus apparent that the sideslip effect must be corrected for to obtain the necessary accuracy for certification.

SUMMARY OF THE INVENTION

The present invention relates to multi-function air data sensing systems which provide highly accurate redundant measurement capabilities of various air data parameters, such as angle of attack, pressure altitude, and Mach number. Aerodynamic sideslip is a measure of the magnitude of a cross component of airspeed to the forward component of airspeed. Inertial navigation systems will measure yaw angle that is very nearly that of the aerodynamic sideslip at high forward speeds, but such inertial measurements take into account the orientation of the aircraft, and not the wind speed, although inertial inputs can be utilized for compensation of errors in the pressure measurements from air data sensing probes. Additionally, however, compensation information exchanged between multi-function probes, such as differential and local angle of attack between the two sides of an aircraft, can provide an indication of sideslip, utilizing the system disclosed herein.

Redundancy can be obtained in one form of the invention with symmetric probes by utilizing a third forward facing air data sensing probe having its central axis on the center line of the aircraft and, at the forward end of the aircraft. The probe used for the center line probe has ports that will measure pitot pressure and local angle of sideslip. Sideslip is measured by ports on opposite sides of a vertical plane along a central aircraft axis. The angle of sideslip ports are also centered on a plane that is oriented horizontally, or perpendicular to the center plane when the aircraft is oriented to be at a level position (0° angle of attack). The compensation values avoid the need for inertial yaw information, and yet provide redundancy, eliminating a fourth multi-function probe, as is now used to have a totally redundant system. A four probe system has two pairs of symmetrically located probes, with one probe of each pair located on the opposite sides of the aircraft. This would provide two independent measures of local, sideslip compensated pressures. The use of the local sideslip reading from the centerline probe now can be used as input to compensate the local static pressure for aerodynamic sideslip. The local sideslip value from the centerline probe, coupled with two additional measures of local static pressure now give the same two systems as the pneumatically averaged systems. In each case, there are two readings of sideslip compensated local static pressure.

There is a strong correlation between the local sideslip angle that is measured by the center line probe, and the actual aircraft sideslip when the angle of attack is held constant. Using the non-dimensional pressure difference between the zero sideslip case and a non-zero sideslip case ($Cp@\beta=0-Cp@\beta=0$) as a dependent variable, there is a direct linear dependence on the local sideslip angle measured at the centerline probe. It is shown to be true under all aircraft angles of attack. Thus, a direct indication of the effects of sideslip on pressure altitude is achieved without the need for iteration or complex algorithms that would solve for accurate pressure altitudes based on pressure inputs.

When probes are mounted either asymmetrically, or on the same side of the aircraft, simple electrical averaging of the pressures is not likely to provide sufficient accuracy, but it has been found that utilizing information of other locations can be adequate to correct for sideslip errors in the measurements made directly from the probes in use when more complex algorithms are used.

In many installations, the differential angles of attack measured between probes symmetrically located on opposite sides of the aircraft provides a direct indication of sideslip. In some combinations of locations, and some aircraft angles of attack, pressure sensitivity to sideslip can approach zero, but as long as there is sensitivity to sideslip in the measurement of angle of attack between two probes, this indication can be used.

Compensation for sideslip can also be obtained by using a flush mounted static pressure sensing plate with a static port to add an additional pressure with which to compensate for angle of sideslip. Flush plates, symmetrical to one of the multi-function probes is a preferred solution. In other words, with a multi-function probe on one side of the aircraft, a flush static sensing plate would be mounted symmetrically on the opposite side of the aircraft.

DETAILED DESCRIPTION OF THE PREFERRED EMBODIMENTS

Figure 1:
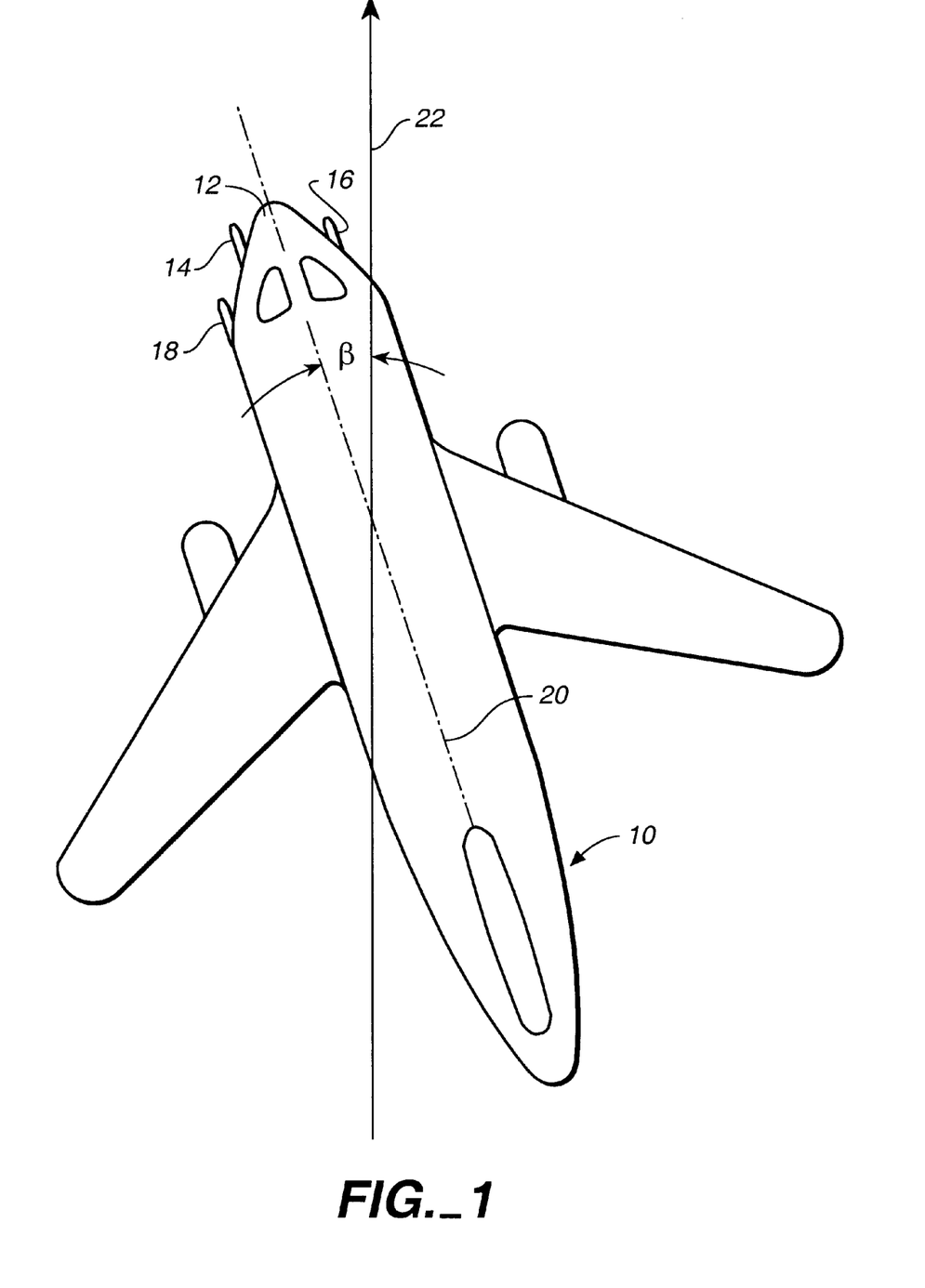
FIG. 1 is a schematic top plan illustration of an aircraft illustrating a sideslip condition.

Referring to FIG. 1, an aircraft indicated generally at 10 is shown with a nose portion 12, mounting a pair of multi-function air data sensing probes indicated schematically on opposite sides of the aircraft and generally at 14 and 16. A third multi-function probe shown at 18 is also shown.

The aircraft in FIG. 1 is depicted with a longitudinal, upright center plane indicated at 20 and the aircraft is shown in a greatly exaggerated sideslip condition where the path of travel is indicated at 22, and there is a substantial angle between the path of travel line and the center plane 20 indicated at $\beta$, which is the angle of sideslip. The aircraft essentially is yawing to the left in FIG. 1, and this can be seen that as the airflow passes across the aircraft, the probes 14 and 18 will be subjected to different flow conditions from probe 16 insofar as the angle and pressure of airflow is concerned.

It also can be envisioned that if the aircraft changes angle of attack, because of the yaw or sideslip angle, the amount of change in pressure at angle of attack ports on one side of the aircraft would be different than that on the other side of the aircraft. When the probes are only electrically connected together, there is no pneumatic way of averaging the pressures for obtaining a correct static pressure reading. The local angle of sideslip can be used as a correction factor to compensate both local angle of attack readings and local static pressure back to freestream conditions.

A multi-function probe is defined as a probe in which a computer is integrally attached as a processor to the probe, and the sensing portions of the probe protrude in the airstream that moves past the aircraft skin, while the processor is an integrated housing immediately inside the skin. The output from multi-function probes (also called probes) is a digital electrical signal representing pressures at sensing ports derived from sampling the pressure readings from internal pressure sensors, either differential sensors or absolute sensors, that receive the pressure signals from the sensing ports and convert them into electrical signals that are then digitized.

Providing redundancy, and accurate pressure measurements that provide precise information, to accurately determine angle of attack and pressure altitude, using a minimum number of probes to save weight and cost, is a goal.

Figure 2:
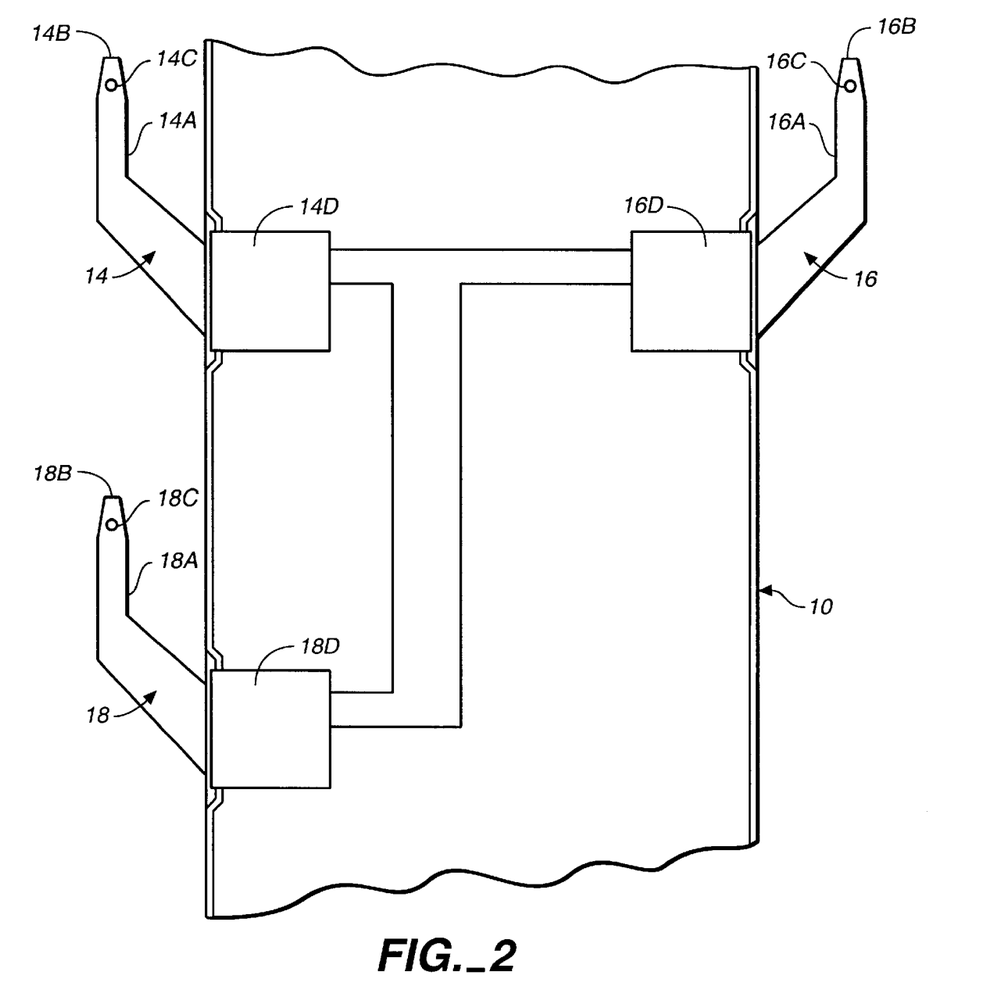
FIG. 2 is a schematic representation of a cross section of a nose portion of an aircraft showing placement of multi-function air data sensing probes in one configuration.
Figure 9:
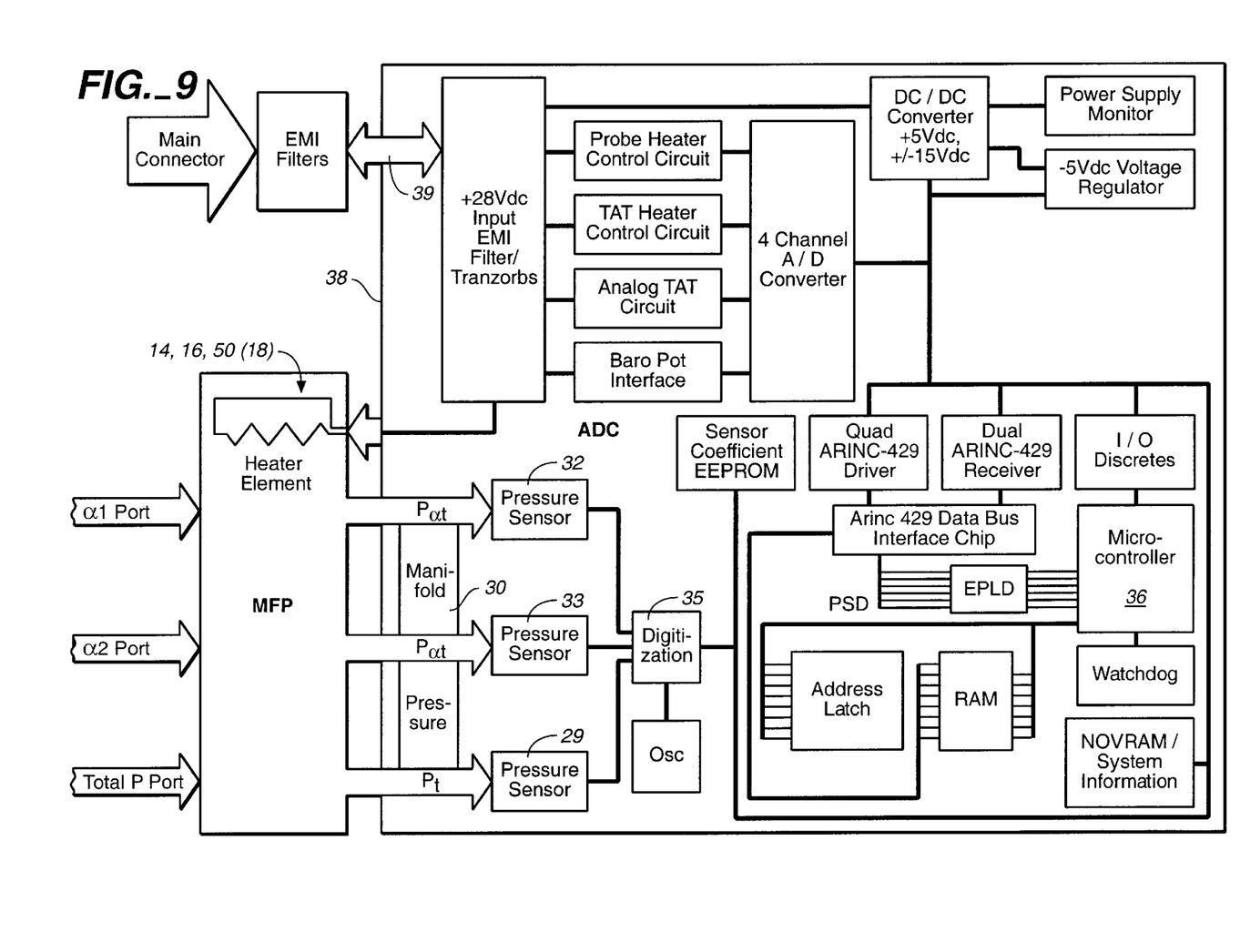
FIG. 9 is a schematic representation of instrumentation for a multi-function probe.

The probes 14 and 16 and 18 may be multifunction probes such as that shown in the U.S. Pat. No. 4,378,696, or similar probes with processor circuitry, as shown in FIG. 9. As shown in FIG. 2, schematically, the probes have barrels 14A, 16A and 18A, with suitable ports for sensing pitot pressure at leading ends of the probes indicated at 14B, 16B and 18B. The angle of attack sensing ports are placed on the top and bottom of the probe barrels, and the top angle of attack sensing ports are illustrated schematically at 14C, 16C and 18C. Mating ports are on the lower sides of the barrels, as is well known, for measuring the angle of attack by sensing the differentials in pressure between the upper port and the lower port on the same probe. The lower ports on the probes will sense pressures designated $P\alpha_1$, and the upper ports shown at 14C, 16C and 18C sense a pressure designated $P\alpha_2$. Each of the probes 14, 16 and 18 is provided with a separate instrument housing 14D, 16D and 18D, respectively.

The arrangement of the multi-function probe circuitry is shown in block diagram in FIG. 9, and schematically shows a probe that can be any one of the probes 14, 16 or 18, and which is shown as a box labeled as a multi-function probe. Pressure inputs are illustrated schematically as being from the angle of attack $\alpha_1$, pressure port, and $\alpha_2$ pressure port, and from the total pressure or pitot port. These pressures are then transmitted through a manifold 30 to individual pressure sensors 32, 33 and 34, and the electrical signals representing these pressure inputs are provided to a digitization section 35. Computer or processor circuitry includes a micro controller 36, and other related circuits all forming part of a probe mounted air data computer 38. This is shown by way of example only. It can be seen that a data bus 39 can be provided for receiving information from other ones of the multi-function probes, and transmitting information to the other multi-function probes on the aircraft. One of the air data computers on the probes can be the main processor for providing the corrections needed.

Figure 3:
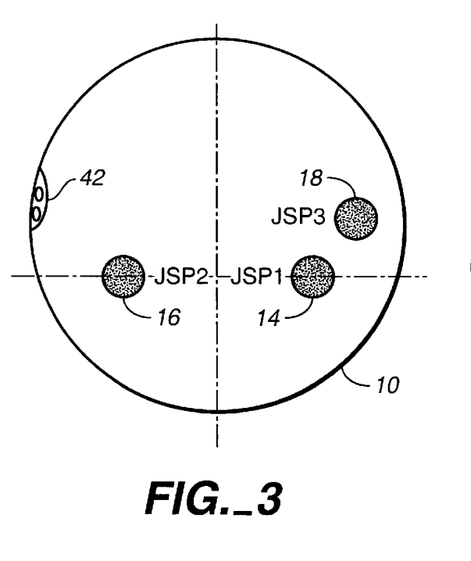
FIG. 3 is a schematic view of an aircraft fuselage showing placement of multi-function probes conventionally used on an aircraft with one combination showing a multi-function probe used in conjunction with a flush static port measurement.
Figure 4:
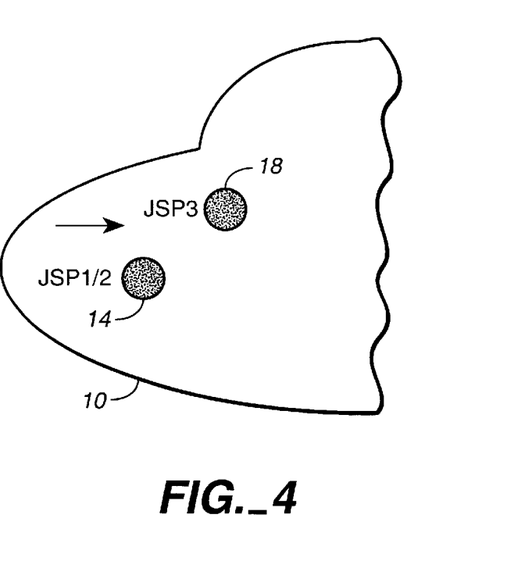
FIG. 4 is a side elevational view of the nose portion shown in FIG. 3.

FIGS. 3 and 4 illustrate a typical arrangement of the multi-function probes from a front view and side view of an aircraft. These probes are labeled, and identified schematically, but would be multi-function probes that would measure pitot pressure, and angle of attack pressures comprising $\alpha_1$ and $\alpha_2$.

Probes 14 and 16 are symmetrically located, and on the same "water level" or vertical height on the aircraft, so that they are in identical positions. The effect of sideslip can be compensated with probes that are symmetrically located such as probes 14 and 16 by electrically averaging the outputs and used for providing a calculated static pressure. However, probe 18 is affected differently in sideslip conditions than either one of probes 14 or 16, so compensation has to be separately provided if a redundant system is to be developed utilizing one of the probes 14 or 16 and the probe 18. Such compensation can come from a flush static sensing plate shown at 42 that is symmetrically located relative to the probe 18. The static pressure sensing plate 42 is a known construction that is flush with the aircraft skin and has static pressure sensing ports therein. The effect of sideslip can be compensated by utilizing the pressure at the flush plate 42. The sensed pressure at plate 42 will also change with angle of sideslip, but the conversion from local pressure to measured pressure is substantially unaffected by local angle of attack. For an equivalent level of redundancy, the plate 42 could be replaced by an additional multi-function probe. Those skilled in the art will recognize other combinations in which local static pressure or local angle of attack information is supplied to a single multi-function probe to compensate for the effects of sideslip.

Figure 5:
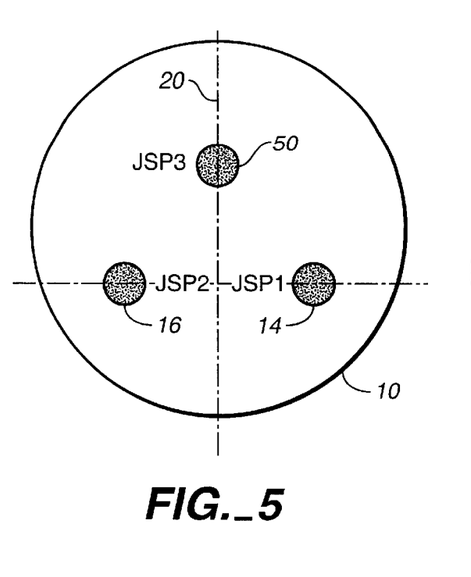
FIG. 5 is a front elevational view of an aircraft having three air data sensing multi-function probes thereon with one probe on the center plane of the aircraft.
Figure 6:
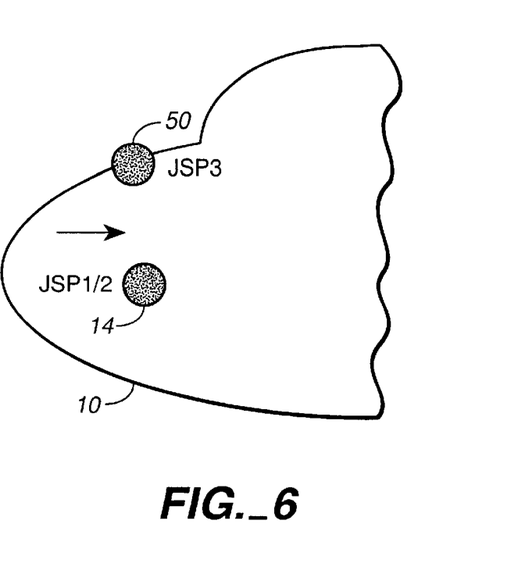
FIG. 6 is a schematic side view of the arrangement shown in FIG. 5.
Figure 8:
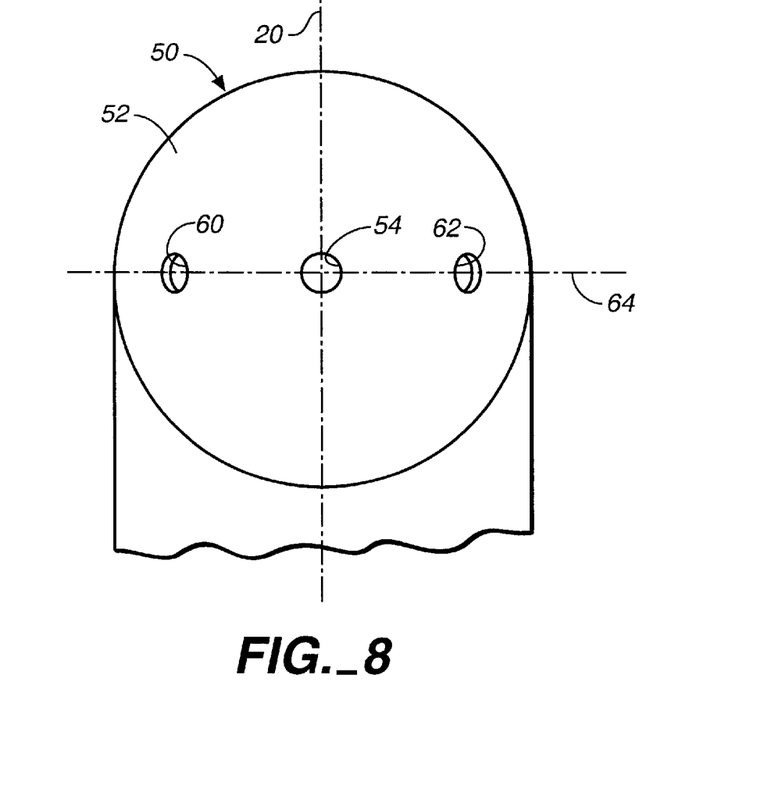
FIG. 8 is a front view of a center mounted multi-function probe used with the present invention.

In FIGS. 5 and 6, the arrangement of probes of the present invention is illustrated. Probes 14 and 16 are positioned as before, but a third sensor or probe 50, which may include an air data computer, is mounted with its center plane on the center plane 20 of the aircraft. The sensor or probe 50 is capable of delivering local sideslip information and may be a multi-function probe or a conventional angle of attack/ sideslip vane for example. The leading end of the probe 50 is shown in FIG. 8. The probe barrel has a leading end 52 that has a forwardly facing or axial port 54 for sensing pitot pressure. Probe 50 has ports that directly sense pressure differentials caused by sideslip. A pair of ports 60 and 62 having axes defining a plane 64 that is perpendicular to the center plane 20 are sensitive to angle of sideslip. Angle of sideslip can be sensed in the same manner as that described in connection with a five hole probe that also has angle of attack sensor ports, in U.S. Pat. No. 3,318,146.

Indications of differential pressures at ports 60 and 62 will give a systematic indication of angle of a sideslip in combination with information from the measurement at port 54. This reading then can be used to correct the angle of attack readings in either one of the probes 14 and 16, providing redundancy of angle of side slip corrections directly to one of the probes 14 or 16 if one of those probes should fail for a system that relies on averaging of local angle of attacks to compensate for the effects of sideslip. The primary system could remain the sensing of angle differentials or raw angle of attack between the probes 14 and 16 (as discussed in previous art), that can provide direct corrections for static pressure as well as angle of attack based upon the indicated differences at the two probes.

Use of a single centerline mounted probe, which is either at the top of the aircraft, as illustrated, or positioned on the center plane at the bottom of the aircraft, will provide the redundancy necessary for insuring that continued accurate pressure readings will be provided, even if one of the probes should fail.

The first source of sideslip correction is the related to the exchange of information between the two symmetrically mounted probes 14 and 16, and the second source is the sideslip measurement at probe 50.

It has been noted that the angle of attack sensed at the probe 50 generally is not needed, so a probe that has three ports as shown, with the sideslip ports lying along the plane 64 which is perpendicular to the plane 20 can be used.

Figure 11:
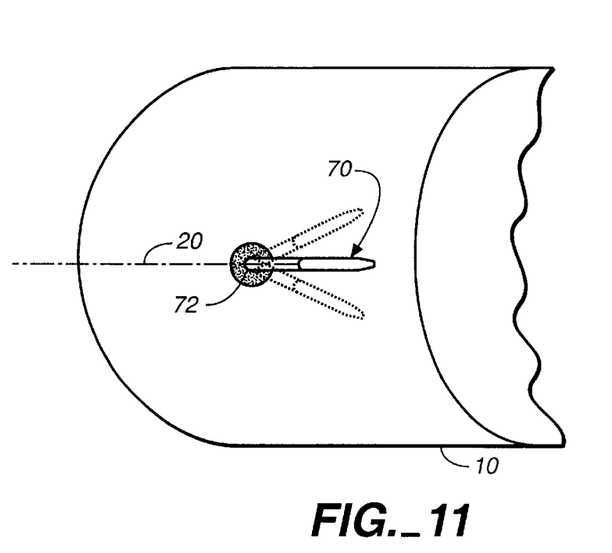
FIG. 11 is a schematic top plan view of an angle of sideslip measuring vane mounted on the top of an aircraft on the center plane of the aircraft.

FIG. 11 is a schematic top plan view of a center line mounted angle of sideslip vane sensor. The vane sensor has a central axis 72 about which the vane will pivot. The vane can be any conventional angle of sideslip vane, but as can be seen the axis 72 is mounted on the center plane 20 of the aircraft, so that the axis is coplanar with that plane.

The angle of sideslip then is measured directly by instrumentation indicated at 74 of conventional design. This vane can be used interchangeably with the probe 50 as a center mounted angle of sideslip sensor.

Figure 7:
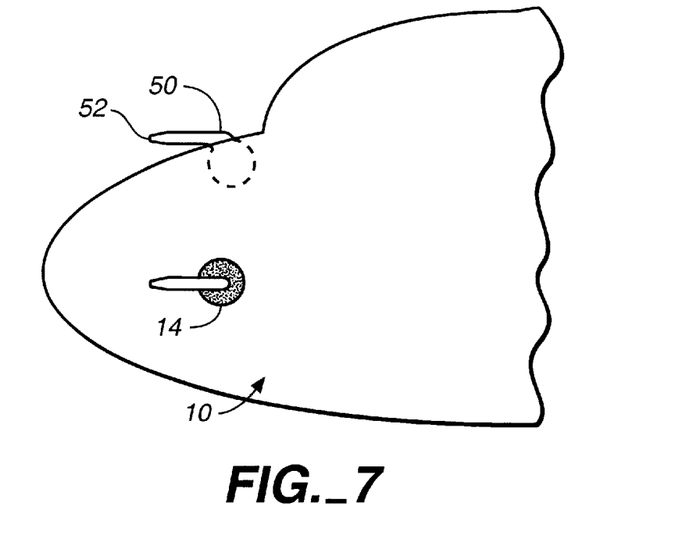
FIG. 7 is a further schematic side view of the probe locations of FIG. 6.

From a side view, the vane would be mounted similarly to FIG. 7 on the top side of the aircraft, and extended axis 72 would be leading the vane.

Again, vane angle sensors are well known and this is illustrated just only schematically.

The factors for compensating the local angle of attack readings can be arrived at by wind tunnel tests, or by actual flight analysis for a particular aircraft configuration. The compensation factors will be different for each aircraft and location of probe combinations, but will be programmed into the processors of the individual multi-function probes used with that aircraft. In other words, the angle of attack or sideslip compensated local static pressure measured by either one of the probes 14 and 16 can be modified to the correction factor determined by the angle of sideslip measured by the centerline probe.

Figure 10:
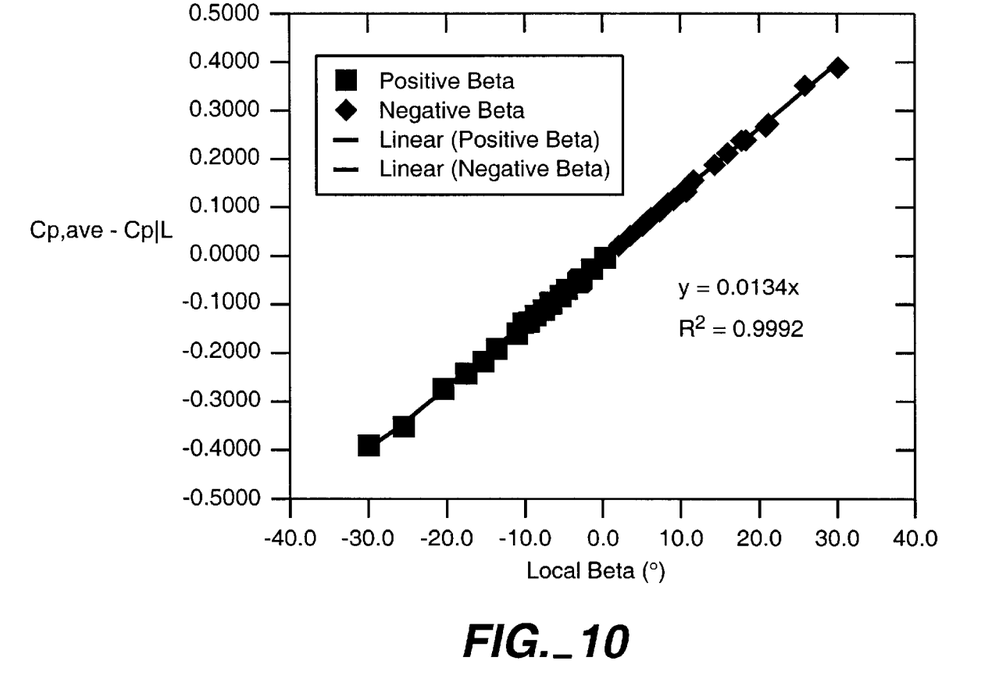
FIG. 10 is a plot showing the change in pressure coefficient as a function of local angle of sideslip sensed with a probe located on the centerline of the aircraft.

In FIG. 10, a plot showing the correction factors based upon local angle of sideslip ($\beta_l$) is illustrated. $\beta_l$ can be measured by either a probe 50 or a vane 70 placed on the centerline of the aircraft. The plot is for a difference in the pressure coefficient at the left or right hand side probes when there is no aircraft sideslip and when an aircraft sideslip exists.

The equations are as follows:

$$C_{p,ave} = \frac{P_{l,ave} - P}{q_c}$$

$$C_{p|L} = \frac{P_l - P}{q_c}$$

$$C_{p,ave} - C_{p|L} = k\beta_l$$

$C_{p,ave}$=Pressure coefficient for the average of the left and right hand side local static pressures for symmetrically mounted probes relative to the plane indicated at 20 non-dimensionalized by the impact pressure for the aircraft evaluated at either probe 14 or 16

$P_{p,ave}$=Average of the left and right hand side local static pressures for symmetrically mounted probes relative to the plane indicated at 20

$C_{P|L}$=Pressure coefficient for the local static pressure relative to the freestream static pressure non-dimensionalized by the impact pressure for the aircraft evaluated at either probe 14 or 16

$P_l$=local static pressure at either probe 14 or 16

$q_c$=impact pressure for aircraft ($P_t$−P=$q_c$)

$P_t$=total pressure

P=free stream static pressure $\beta_l$=local angle of sideslip as measured at the centerline probe k=non-dimensional slope of the line that relates local sideslip to difference in pressure coefficients Also, if the centerline probe 50 is disabled, or becomes inoperative, the primary system of determining the port pressures and making corrections for angle of sideslip by correlating the differences and indicated or local angle of attack between the probes 14 and 16 will still be effective. The correction factors are arrived at by flight or wind tunnel testing. If either one of the probes 14 or 16 becomes inoperative, the correction of the local angle of attack for sideslip can be made by correlating the sideslip signals from the probe 50 to arrive at the correction factor.

The corrections can be made not only for angle of attack, but also for static pressure that is derived from the measured pressures on each probe, namely the pitot pressure, as well as $P_{\alpha 1}$ and $P_{\alpha 2}$ at the two angle of attack measuring ports on such probe.

Although the present invention has been described with reference to preferred embodiments, workers skilled in the art will recognize that changes may be made in form and detail without departing from the spirit and scope of the invention.

What is claimed is:

1. An air data sensor system comprising first and second probes forming a pair of probes symmetrically mounted on opposite sides of an aircraft, the probes each having ports for sensing angle of attack and pitot pressure, each of the probes including instrumentation for providing electrical signals indicating the pressure at each of the ports on the respective probe, and providing local angle of attack at the probes as a function of differential pressure between the angle of attack sensing ports and total pressure measurement sensed at the pitot port, and a third probe mounted to have an axis thereof substantially on a center plane of the aircraft in which angle of attack is measured, said third probe having a pair of ports with axes lying on a plane perpendicular to the center plane of the aircraft to directly measure differences in pressure at the pair of ports on the third probe caused by the sideslip of the aircraft, said third probe having communication instrumentation for providing correction factors to compensate for sideslip effects on local angle of attack and local static pressure measurements at at least one of the first and second probes due to sideslip.

2. The air data sensing system of claim 1, wherein said third probe is mounted on an upper surface of the aircraft.

3. The air data sensing system of claim 1, wherein said third probe is mounted on a lower surface of the aircraft.

4. The air data sensing system of claim 1, wherein said third probe includes ports for independently measuring angle of attack in the center plane of the aircraft.

5. An air data sensing system for aircraft having a central plane that is substantially vertical during normal flight, a first probe and a second probe mounted on a common plane generally perpendicular to the central plane and on opposite sides of the aircraft, such that the probes are symmetrically mounted, each of said first and second probes including angle of attack sensing ports comprising an upper port and a lower port, and each probe having a forwardly facing port for measuring Pitot pressure, each of the probes having pressure sensors for delivering electrical signals representative of a pressure at each of the ports, and a third probe having a central axis, and mounted such that the central axis of the third probe is on the center plane of the aircraft, said third probe having ports that are positioned on opposite sides of, and at equal angles to the center plane of the aircraft, and the ports of the third probe defining a plane perpendicular to the center plane in the aircraft for measuring sideslip of the aircraft.

6. The air data sensing system of claim 5, wherein the third probe has a pitot pressure sensing port on an end thereof facing airflow.

7. The air data sensing system of claim 5, wherein each of the first, second and third probes has pressure sensors and processor circuitry supported on the probe.

8. The air data sensing system of claim 7, wherein there is a data bus between the processor circuitry of the first, second and third probes.

9. An air data sensing system for aircraft having a central plane that is substantially vertical during normal flight, a first probe and a second probe having probe central axes and mounted with the probe central axes on a first common plane generally perpendicular to the central plane and on opposite sides of the aircraft, such that the probes are symmetrically mounted, each of said first and second probes including angle of attack sensing ports comprising an upper port and a lower port, and each probe having a forwardly facing port for measuring Pitot pressure, each of the probes having pressure sensors for delivering electrical signals representative of a pressure at each of the ports, and a third sensor having a central axis, and mounted such that the central axis of the third sensor is on the center plane of the aircraft, said third sensor having a pair of forwardly facing third sensor ports having axes inclined outwardly from the third sensor central axis and lying on a second common plane parallel to and spaced from the first common plane, the second common plane being perpendicular to the central plane, pressure differentials at the pair of third sensing ports, providing an indication of angle of sideslip of the aircraft.

10. The air data sensing system of claim 9, wherein the third sensor comprises a third probe, and the third sensor ports being at equal angles to the central plane of the aircraft.

11. The air data sensing system of claim 10, wherein the third probe has a pitot pressure sensing port on an end thereof facing airflow.

12. The air data system of claim 9, wherein said third sensor comprises an airflow sensitive vane having an axis oriented to measure local angle of sideslip.

* * * * *